United States Patent [19]

Takoshima

[11] Patent Number: 4,713,671
[45] Date of Patent: Dec. 15, 1987

[54] THERMAL HEAD

[75] Inventor: Takehiro Takoshima, Furukawa, Japan

[73] Assignee: Alps Electric Co., Ltd., Japan

[21] Appl. No.: 926,370

[22] Filed: Oct. 31, 1986

[30] Foreign Application Priority Data

Nov. 1, 1985 [JP] Japan .................. 60-245426

[51] Int. Cl.⁴ .................. G01D 15/10; H05B 3/00
[52] U.S. Cl. .................. 346/76 PH; 219/216; 219/543; 338/308; 338/309
[58] Field of Search .................. 346/76 PH; 219/216; 338/308, 309; 427/58, 90, 96, 402, 404

[56] References Cited

U.S. PATENT DOCUMENTS 4,259,564 3/1981 Ohkubo et al. .................. 219/216
4,516,136 5/1985 Willcox .................. 346/76 PH

FOREIGN PATENT DOCUMENTS 56-150574 11/1981 Japan .................. 400/120

Primary Examiner—E. A. Goldberg
Assistant Examiner—Gerald E. Preston
Attorney, Agent, or Firm—Guy W. Shoup

[57] ABSTRACT

A thermal head having a glass glaze layer, a heat generating resistance layer, an electric power supplying conductor layer and a protecting layer formed on an insulating substrate, wherein the glass glaze layer is so formed that the lower portion thereof is embedded in the insulating substrate and the upper portion thereof is protruded from the surface of the insulating substrate, and a metal layer is disposed in contact with the lower surface of the glass glaze layer.

The heat generating portion can effectively be protruded to render the contact with the recording paper or ink ribbon favorable, thereby improving the heat efficiency. Further, temperature falling rate once after the temperature of the heat generating portion has been raised can be increased.

4 Claims, 4 Drawing Figures

THERMAL HEAD

BACKGROUND OF THE INVENTION

1. Field of the Invention

This invention concerns a thermal head mounted to a thermal printer and, more specifically, it relates to an improvement in the structure of a glass glaze layer.

2. Description of the Prior Art

A thermal head mounted to a thermal printer comprises, for example, a plurality of heat generating resistance elements arranged linearly on an identical substrate, which are heated by electric supply for developing color and performing recording on a heat sensitive recording paper or transferring and performing recording on a common paper by way of an ink ribbon in accordance with this invention.

A thermal head has been prepared so far, for example, as shown in FIG. 4 by partially forming a glass glaze layer 2 on an insulating substrate 1 made of alumina or the like and further laminating thereover a heat generating resistance layer 3 made of $Ta_2N$ or the like, an electric power supplying conductor layer 4 made of Al, Ni or the like, an oxidation preventive layer 5 made of $SiO_2$ or the like and a wear resistance layer 6 made of $Ta_2O_5$ or the like successively. In this case, the electric power supplying conductor layer 4 is patterned into a plurality of individual electrodes and a common electrode, between which heat generating portions A are formed. The heat generating portion A is formed at a portion protruded by the glass glaze layer 2, by which a favorable contact with the recording paper or ink ribbon is attained.

Recently, it has been required to the thermal head that recording is possible with a flat surface paper and that a high speed recording is possible. In order to realize the requirements, it is necessary to increase the heat efficiency by improving the heat conductivity of the heat generating portion. Further, the thermal head is also required for such characteristics that the temperature rising in the heat generating portion is fast and that the temperature falling after reaching the maximum temperature is also fast.

When forming the glass glaze layer 2 on the insulating substrate 1 in the conventional thermal head, a paste prepared by mixing a glass frit and binder is coated by printing on the insulating substrate 1 followed by sintering. However, the paste described above, when coated on the insulating substrate 1, extends laterally due to the surface tension failing to effectively protrude the heat generating portion A. Specifically, the glass glaze layer 2 has a height h of about 40 μm and the lateral width w of about 500-700 μm, which is actually extremely flat. Then, the effect of improving the contact of the heat generating portion A is poor failing to improve the heat efficiency sufficiently.

Furthermore, although it may be considered to effectively protrude only the heat generating portion A by restricting the width of the glass glaze layer 2 narrower, the following problems arise in this case. That is, while the glass glaze layer 2 has a function of protruding the heat generating portion A to improve the function of contact, it also has an effect of accumulating heat for increasing the heat generation temperature. If the heat generated from the heat generating portion A is conducted to and dissipated from the heat insulating substrate 1 too rapidly, the temperature of the heat generating portion A can not be increased sufficiently. Therefore, it is required for the glass glaze layer 2 to have a heat capacity to some extent but it is also desired that the temperature falls rapidly once after the heat generating portion has reached a predetermined temperature.

SUMMARY OF THE INVENTION

The object of this invention is to overcome the foregoing problems in the prior art and to provide a thermal head capable of improving the contact of the heat generating portion with the recording paper or ink ribbon, as well as increasing the rising and falling rate of the temperature for the heat generating portion.

The foregoing object of this invention can be attained by a thermal head in accordance with this invention having a glass glaze layer, a heat generating resistance layer, an electric power supplying conductor layer and a protection layer formed on an insulating substrate, wherein the glass glaze layer is formed such that the lower portion thereof is embedded in the insulating substrate and the upper portion thereof is protruded from the surface of the insulating substrate, and a metal layer is arranged in contact with the lower surface of the glass glaze layer.

In this way, since the glass glaze layer is embedded at the lower portion thereof in the insulating substrate and protruded at the upper portion thereof from the surface of the insulating substrate, a predetermined amount of volume can be ensured even if the width of the glass glaze layer is restricted narrower. Accordingly, the heat generating portion can be effectively protruded to improve the contact with the recording paper or ink ribbon, as well as the heat capacity required for increasing the heat generating temperature can also be ensured. Further, since the metal layer is arranged in contact with the lower surface of the glass glaze layer, heat is dissipated through a highly heat conductive metal layer once after the heat generating portion has heated to a predetermined temperature and the temperature falling at the heat generating portion can also be improved. Accordingly, the thermal head according to this invention is satisfactory in the heat efficiency and excellent in the high speed response.

In a preferred embodiment according to this invention, the metal layer in contact with the lower surface of the glass glaze layer is formed continuously over the entire lower surface of the insulating substrate. Since the heat conducted from the glass glaze layer to the metal layer is thus dissipated from the entire lower surface of the insulating substrate, the temperature falling rate at the heat generating portion can be increased. Such a structure can include, more specifically, a structure in which a metal block made of copper or the like is inserted into and brazed to the bottom of perforation formed to the insulating substrate, a metal layer is formed to the lower surface of the insulating substrate and the metal block is bonded to the metal layer, or a structure in which a perforation is formed to the insulating substrate and a metal layer also covering the perforation is disposed to the lower surface of the heat insulating substrate. In a further preferred embodiment according to this invention, the glass glaze layer is formed by bonding high melting glass by means of a lower melting glass to the heat insulating substrate. In this embodiment, since previously shaped high melting glass is used as a skeleton, a structure in which the heat generating portion is protruded more can be attained. More specifically, such a structure can be attained by forming a perforation to the insulating substrate, inserting a bar-like member made of high melting glass into the perforation and bonding the bar-like member by means of lower melting glass to the heat insulating substrate. Although the quartz glass is preferred as the high melting glass, any of silicic acid type high melting glass comprising oxides at higher Si, Al ratio can be used. Further, any of lower melting glasses with the melting point relatively lower than that of the higher melting glass can be used. In this case, it is preferred that at least the heat generating portion is not covered with the low melting glass, because since the heat generating portion goes nearly to several hundreds °C.–500° C., it may possibly exceed the glass transition point of the low melting glass.

Although the layer structure of the thermal head according to this invention has no particular restriction, it can employ such a constitution, for example, prepared by forming the glass glaze layer on a predetermined portion of the insulating substrate and then laminating, further thereover, a heat generating resistance layer, an electric power supplying conductor layer, an oxidation preventive layer and a wear resistance layer successively.

BRIEF DESCRIPTION OF THE ACCOMPANYING DRAWINGS

These and other objects, features, as well as advantageous of this invention will become apparent by reading the description for the preferred embodiment according to this invention while referring to the accompanying drawings, wherein FIG. 1 is a cross sectional view for a portion of one embodiment of a thermal head according to this invention, FIG. 2 is a cross sectional view for a portion of the other embodiment of a thermal head according to this invention, FIG. 3 is a cross sectional view for a portion of a further embodiment of a thermal head according to this invention, and FIG. 4 is a cross sectional view for a portion of one embodiment of a conventional thermal head.

DESCRIPTION OF PREFERRED EMBODIMENTS

Figure 1:
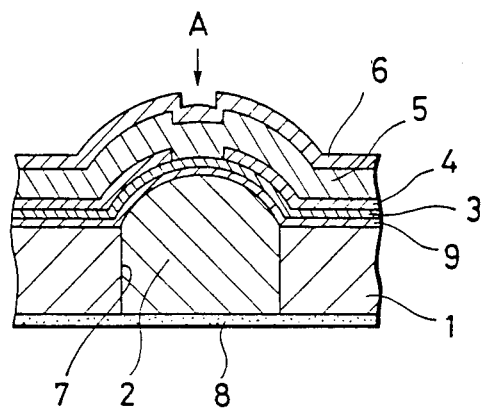

FIG. 1 shows one embodiment of a thermal head according to this invention.

In the thermal head, an elongate narrow perforation 7 is formed to a predetermined portion (the portion disposed with a heat generating portion) in an insulating substrate 1, for example, made of alumina, while the glass glaze layer 2 is filled to the inside of the perforation 7 and formed so as to protrude from the upper surface of the insulating substrate 1. The glass glaze layer 2 is formed to a width of about 200 $\mu$m. The width of the glass glaze layer 2 is, preferably, set as: longitudinal dimension of the heat generating dot portion+(=-10–30 $\mu$m). Accordingly, it is preferably less than 200 $\mu$m and, more preferably, less than 100–150 $\mu$m in the case of 24 or 32 dots. Further, a metal layer 8 also covering the perforation 7 is formed to the lower surface of the insulating substrate 1. The metal layer 8 is in contact with the lower surface of the glass glaze layer 2. The metal layer 8 usable herein can include, for example, a metal sheet made of aluminum, copper, etc. appended to the substrate, or metal film formed by vacuum deposition, sputtering or the like.

Then, an undercoat layer 9 made of $Ta_2O_5$ is formed on these layers and a heat generating resistance layer 3 made of $Ta_2N$ is formed further thereover to a thickness of 0.05 $\mu$m. An electric power supplying conductor layer 4 made of an Al film to a thickness of 1.5 $\mu$m is formed on the heat generating resistance layer 3. The electric power supplying conductor layer 4 is pattern-etched into individual electrodes and a common electrode, between which are disposed heat generating dot portions merely composed of the heat generating resistance layer 3. An oxidation preventive layer 5 made of $SiO_2$ to a thickness of 2 $\mu$m is formed on the electric power supplying conductor layer 4 and, wear-resistance layer 6 made of $Ta_2O_5$ is formed to a thickness of 5 $\mu$m further on the oxidation preventive layer 5. Each of these layers can be formed by way of sputtering or vacuum deposition.

Since the width of the glass glaze layer 2 is made narrower as about 200 $\mu$m in this thermal head, a part of the heat generating portion A can effectively be protruded to render the contact with the recording paper or ink ribbon favorable thereby improving the heat efficiency. Further, since the glass glaze layer 2 is filled to the inside of the perforation 7, a sufficient heat capacitance can be ensured to increase the rising rate of the heat generating temperature. Furthermore, since the glass glaze layer 2 is in contact at the lower surface thereof with the metal layer 8, the falling rate once after the heat generating temperature has been raised is also increased. Accordingly, a high speed response is possible.

Figure 2:
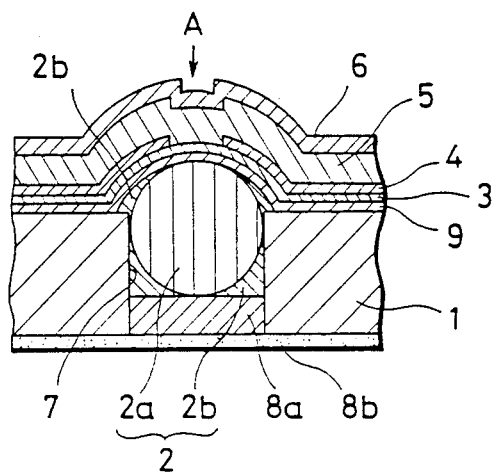

FIG. 2 shows another embodiment of the thermal head according to this invention, in which those portions having the same structure as in FIG. 1 carry the same reference numeral and the explanation therefor are omitted.

In this thermal head, a copper block 8a is inserted into a perforation 7 formed in an insulating substrate 1 and secured by means of brazing to the insulating substrate. Further, a metal layer 8b is formed to the lower surface of the insulating substrate 1 and the metal layer 8b covers the perforation 7, as well as joins the copper block 8a. A round bar 2a made of quartz glass is inserted and disposed within the perforation 7 and the round bar 2a is secured by means of low melting glass 2b to the insulating substrate 1. In this case, the round bar 2a is so disposed that it protrudes in an arcuate cross section from the inside of the perforation 7 above the insulating substrate 1. Then, the glass glaze layer 2 comprising the round bar 2a and the low melting glass 2b is formed and the glass glaze layer 2 is in contact at the lower surface thereof with the copper block 8a. In the thermal head, since the round bar 2a made of quartz glass is used for the glass glaze layer 2, the heat generating portion A can be protruded more to improve the contact property.

Figure 3:
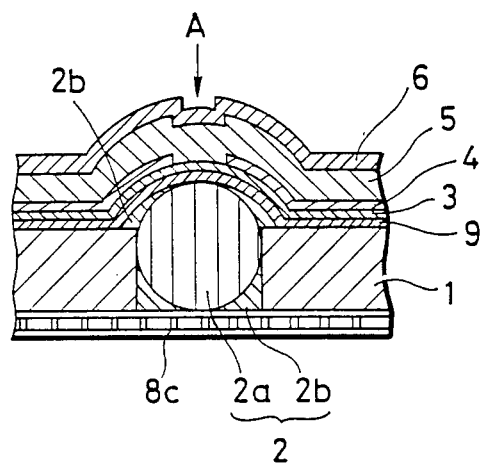
Figure 4:
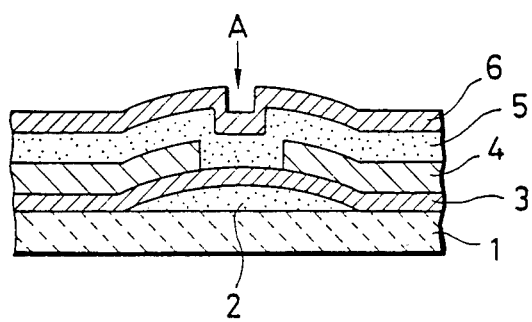

FIG. 3 shows a further embodiment of the thermal head according to this invention, in which the parts of the same constitution as those in FIG. 1 carry the same reference numerals and the explanations therefor are omitted.

In this thermal head, a perforation 7 is formed to the insulating substrate 1 and a multi-layered wiring substrate 8c is appended to the lower surface of the insulating substrate 1. Then, in the manner similar to the case of FIG. 2, a round bar 2a made of quartz glass is inserted and exposed to the inside of the perforation 7 and the round bar 2a is secured by means of the low melting glass 2b to the insulating substrate 1 to constitute a glass glaze layer 2. In this embodiment, the glass glaze layer 2 is in contact at the lower surface thereof with a multi-layered wiring substrate 8c. Accordingly, the heat after the heat generation from the heat generating portion A is dissipated externally through the conductor layer of the multi-layered wiring substrate 8c.

As has been described above according to this invention, since the glass glaze layer is embedded at the lower portion thereof in the insulating substrate and protruded at the upper portion thereof from the surface of the insulating substrate, it is possible to effectively protrude the heat generating portion, render the contact with the recording paper or ink ribbon favorable and improve the heat efficiency. Further, since the metal layer is disposed in contact with the lower surface of the glass glaze layer, temperature falling rate once after the temperature of the heat generating portion has been raised can be increased.

What is claimed is:

1. A thermal head having a glass glaze layer, a heat generating resistance layer, an electric power supplying conductor layer and a protecting layer formed on an insulating substrate, wherein said glass glaze layer is so formed that the lower portion thereof is embedded in said insulating substrate and the upper portion thereof is protruded from the surface of said insulating substrate, and a metal layer is disposed in contact with the lower surface of said glass glaze layer.

2. A thermal head as defined in claim 1, wherein the metal layer in contact with the lower surface of the glass glaze layer is formed continuously over the entire lower surface of the insulating substrate.

3. A thermal head as defined in claim 1, wherein the glass glaze layer is formed by bonding high melting glass by means of low melting glass having a lower melting point to the insulating substrate.

4. A thermal head as defined in claim 2, wherein the glass glaze layer is formed by bonding high melting glass by means of low melting glass having a lower melting point to the insulating substrate.

* * * * *